US012740566B2

(12) United States Patent
Arndt et al.

(10) Patent No.: US 12,740,566 B2
(45) Date of Patent: Sep. 22, 2026

(54) ENHANCED HERBICIDAL COMPOSITIONS OF TRANSITION METAL CHELATES

(71) Applicant: W. Neudorff GMBH KG, Emmerthal (DE)

(72) Inventors: Reinhard Arndt, Hannover (DE); Andreas Prokop, Hannover (DE); George Puritch, Vancouver (CA); Chandanie W. Arachchige, Vancouver (CA); Deepal Samarajeewa, Vancouver (CA)

(73) Assignee: W. Neudorff GMBH KG, Emmerthal (DE)

( * ) Notice: Subject to any disclaimer, the term of this patent is extended or adjusted under 35 U.S.C. 154(b) by 488 days.

(21) Appl. No.: 18/221,807

(22) Filed: Jul. 13, 2023

(65) Prior Publication Data

US 2023/0354814 A1 Nov. 9, 2023

Related U.S. Application Data

(63) Continuation of application No. 16/081,870, filed as application No. PCT/EP2016/082507 on Dec. 22, 2016, now abandoned.

(30) Foreign Application Priority Data

Mar. 1, 2016 (GB) ..................................... 1603575

(51) Int. Cl.
*A01N 55/02* (2006.01)
*A01N 37/44* (2006.01)
*A01N 59/08* (2006.01)
*A01N 59/16* (2006.01)

(52) U.S. Cl.
CPC ............. *A01N 55/02* (2013.01); *A01N 37/44* (2013.01); *A01N 59/08* (2013.01); *A01N 59/16* (2013.01)

(58) Field of Classification Search
CPC ........ A01N 55/02; A01N 37/44; A01N 59/08; A01N 59/16
See application file for complete search history.

(56) References Cited

U.S. PATENT DOCUMENTS

| | | | |
|---|---|---|---|
| 4,508,559 | A | 4/1985 | Kollman |
| 4,597,883 | A | 7/1986 | Lengyel |
| 4,975,110 | A | 12/1990 | Puritch et al. |
| 5,035,741 | A | 7/1991 | Puriich et al. |
| 5,098,468 | A | 3/1992 | Puritch et al. |
| 5,106,410 | A | 4/1992 | Puritch et al. |
| 6,218,336 | B1 | 4/2001 | Coleman |
| 6,271,177 | B1 | 8/2001 | Hudetz |
| 6,372,690 | B1 | 4/2002 | Gregoire et al. |
| 6,509,297 | B1 | 1/2003 | Coleman |
| 6,812,190 | B2 | 11/2004 | Coleman |
| 6,969,696 | B2 | 11/2005 | Coleman |
| 11,412,735 | B2 | 8/2022 | Arachchige et al. |
| 2003/0181332 | A1 | 9/2003 | Sedun et al. |
| 2007/0203026 | A1 | 8/2007 | Duncan |
| 2010/0267562 | A1 | 10/2010 | Christians |
| 2011/0306495 | A1 | 12/2011 | Samarajeewa et al. |
| 2012/0149569 | A1 | 6/2012 | Prosch et al. |
| 2013/0129804 | A1 | 5/2013 | Schweinsberg et al. |
| 2013/0130897 | A1 | 5/2013 | Christians et al. |
| 2013/0287749 | A1 | 10/2013 | Wirth et al. |
| 2016/0157493 | A1 | 6/2016 | Sedun et al. |
| 2019/0124928 | A1 | 5/2019 | Arndt et al. |
| 2023/0354814 | A1 | 11/2023 | Arndt et al. |

FOREIGN PATENT DOCUMENTS

| | | |
|---|---|---|
| CA | 3016763 | 1/2023 |
| CN | 101928170 | 12/2010 |
| CN | 102422993 | 4/2012 |
| CN | 102503641 | 6/2012 |
| CN | 103319256 | 9/2013 |
| CN | 104489364 | 4/2015 |
| EP | 2452930 | 5/2012 |
| EP | 16823289.0 | 2/2020 |
| EP | 17768384.4 | 7/2020 |
| GB | 1287749 | 9/1972 |
| GB | 1.491.215 | 11/1977 |
| GB | 1603575.0 | 8/2016 |
| GB | 1614648.2 | 12/2016 |
| JP | 2009/256278 | 11/2009 |
| WO | 2003/073856 | 9/2003 |
| WO | 2009/048345 | 4/2009 |
| WO | 2011/005742 | 1/2011 |
| WO | 2011/154541 | 12/2011 |
| WO | 2015/126267 | 8/2015 |
| WO | PCT-EP-2017-071807 | 11/2017 |

(Continued)

OTHER PUBLICATIONS

U.S. Appl. No. 16/081,870, filed Oct. 3, 2019.
U.S. Appl. No. 16/081,870, filed Apr. 17, 2020.
U.S. Appl. No. 16/081,870, filed Jun. 29, 2020.
U.S. Appl. No. 16/328,707, filed Oct. 16, 2020.
GB Search Report dated Aug. 30, 2016 for GB application No. 1603575.0, 4 pages.
International Search Reort and Written Opinion dated Mar. 1, 2017 for PCT application No. PCT/EP2016/082507, 13 pages.
Written Opinion of the International Preliminary Examining Authority dated Feb. 19, 2018 for PCT applicaton No. PCT/EP2016/082507, 8 pages.

(Continued)

*Primary Examiner* — David Browe
(74) *Attorney, Agent, or Firm* — EVAN LAW GROUP LLC

(57) ABSTRACT

The present invention relates to herbicidal compositions comprising a transition metal chelate; and a potassium-containing salt and/or a sodium-containing salt; wherein said composition has enhanced herbicidal activity when compared with an otherwise identical composition lacking said potassium-containing salt and/or said sodium-containing salt; as well as related methods and uses.

20 Claims, No Drawings

(56) References Cited

FOREIGN PATENT DOCUMENTS

WO PCT-EP-2016-082507 5/2018

OTHER PUBLICATIONS

Shrestha, A. et al., "Comparative efficacy of white mustard (*Sinapis alba* L.) and soybean (*Glycine max* L. Merr.) seed meals as bioherbicides in organic broccoli (*Brassica oleracea* Var. Botrytis) and spinach (*Spinacea oleracea*) production", Communications in Soil Science and Plant Analysis, vol. 46, No. 1, pp. 33-46, (2014).
Yu, J. et al., "Response of seven weed species to corn gluten meal and white mustard (*Sinapis alba*) seed metal rates", Weed Technology, vol. 28, No. 1, pp. 259-265 (2014).
Wang, X. et al., "Herbicidal activity of mustard seed meal (*Sinapis alba* 'IdaGold' and *Brassica juncea* 'Pacific Gold') on weed emergence", Industrial Crops and Products, vol. 77, pp. 1004-1013 (2015).
International Search Report and Written Opinion dated Nov. 7, 2017 for PCT application No. PCT/EP2017/071807, 16 pages.
GB Search Report dated Dec. 20, 2016 for GB application No. GB1614648, 4 pages.
Bonnardeaux, J., "Uses for canola meal", Department of Agriculture and Food, Westem Australia, pp. 1-11, (2007).
Sigma-Aldrich, Safety Data Sheet for "Ethylenediaminetetraacetic acid", pp. 1-7. found at sigma-aldrich.com, printed on Sep. 7, 2018.
Lake, B., "Understanding Soil pH", NSW Agriculture, pp. 1-4, printed on Sep. 7, 2018.
Product Description of "Fiesta Lawn Weed Killer", 3 pages. (2010).
Rawe, L., "Straight talk about iron deficiency and plants", San Antonio Express News, Gardening, Etc,, pp. 1-2, found at: https://bexar-tx.tamu.edu/homehort/archives-of-weekly-articles-davids-plant-of-the-week/straight-talk-about-iron-deficiency-and-plants/, May 25, 2003.
Colby, S.R. "Calculating synergistic and antagonistic responses of herbicide combinations", Weeds, vol. 15, No. 1, pp. 20-22, (1967).
U.S. Appl. No. 16/328,707, filed May 26, 2021.
U.S. Appl. No. 16/081,870, filed Jun. 2, 2021.
U.S. Appl. No. 16/328,707, filed Aug. 20, 2021.
U.S. Appl. No. 16/081,870, filed Feb. 22, 2022.
U.S. Appl. No. 16/328,707, filed Apr. 14, 2022.
U.S. Appl. No. 16/081,870, filed Jul. 18, 2022.
U.S. Appl. No. 16/081,870, filed Oct. 18, 2022.
U.S. Appl. No. 16/081,870, filed Feb. 13, 2022.
U.S. Appl. No. 16/081,870, filed Sep. 6, 2023.
Neudorff, "RasenDunger 5PLUS1", Neudorff Gesamtkatalog, pp. 1-64, (2016).
Neudorff, "RasenDunger SPEZIAL 5Plus1", Neudorff—Sichertheidsdatenblatt, pp. 1-7, (2015).
Neudorff, "5Plus1 ingredients on package", Package photo, p. 1, (2022).
Neudorff, "RasenDunger SPEZAIL 5Plus1", Neudorff—Gebrauchysanweisung, pp. 1-2, (2015).
Aulich, S., "Re: Neudorff Spezial 5+1", Neudorff, 1 page, found at www.neudorff.de/rat-hilfe/forum/kategorien/duengen/neudorff-spezial-5-1-32857/beitraege.html, May 16, 2022.
W. Neudorff GmBH KG, "Fiesta Lawn Weed Killer—Material Safety Data Sheet", found at https://hillsidelawn.com/wp-content/uploads/2022/02/Fiesta-SDS.pdf, pp. 1-2, (2014).
Neudorff, "Screenshot of the website of Neudorff, www.neudorff.de/produkte/rasenduenger-spezial-5plus1.html", 1 page, downloaded on or before Sep. 7, 2022.

ENHANCED HERBICIDAL COMPOSITIONS OF TRANSITION METAL CHELATES

FIELD OF THE INVENTION

The present invention relates to herbicidal compositions and methods for controlling unwanted vegetation.

BACKGROUND

The selective control of unwanted vegetation, such as, for example, weeds, is a major industry. Vegetation can be controlled using herbicides that are non-selective or selective, and systemic or contact. Non-selective herbicides kill or damage all plants to which they are applied, i.e., both desired and undesired vegetation. In contrast, selective herbicides eliminate or inhibit the growth of unwanted vegetation, while leaving the desired vegetation relatively unharmed. Contact herbicides are applied to the top growth, or portion(s) of the plant located above the soil surface. In contrast, systemic herbicides are initially taken up by the roots and/or the foliage of the plant and subsequently translocated to tissues that are remotely located from the point of application.

At present, there are several common types of selective herbicides on the market. The Phenoxy Acid-Type selective herbicides include 2,4-D (2,4-Dicholorophenoxyacetic acid), 2,4-DP (2,4-Dicholorophenoxypropionic acid, or Dichlorprop), and mecoprop (2-(2-methyl-4-chlorophenoxy) propionic acid). These systemic selective herbicides are initially taken up by the leaves, stem or roots of a plant, and subsequently moved throughout the plant. 2,4-D and 2,4-DP stimulate nucleic acid and protein synthesis and affect enzyme activity, respiration, and cell division, while mecoprop affects enzyme activity and plant growth. The Benzoic Acid-Type selective herbicides include dicamba, another systemic selective herbicide that is initially taken up by the leaves and roots of a plant and subsequently moved throughout the plant. Benzoic Acid-Type selective herbicides are similar to the Phenoxy Acid-Type selective herbicides described above.

Currently, these selective herbicides present major toxicological and environmental concerns. Attempts have been made to create selective herbicides that are effective, yet environmentally safe. WO 03/073856 A1 (which is incorporated herein by reference in its entirety) relates to a new class of environmentally safe selective herbicides that includes a transition metal component (Fe, Cu, Zn and/or Mn) and a chelating agent (aminopolycarboxylate, salicylate and/or amino acid). These metal complexones can be applied over an area of established grass and turf in which broadleaf weeds are growing and selectively remove these weeds, leaving the grass unharmed.

While such environmentally safe selective herbicidal compositions have been shown to be effective, there is a need for environmentally safe compositions that demonstrate enhanced herbicidal efficacy (optionally enhanced selective herbicidal efficacy) effective to control undesired vegetation (e.g. weeds) without harming the desired vegetation (e.g. lawn grass). Enhanced herbicidal compositions may demonstrate a more rapid herbicidal effect, and may reduce the amount of herbicidal active ingredient required.

SUMMARY OF THE INVENTION

According to one aspect there is provided a herbicidal composition comprising:

a. a transition metal chelate; and b. a potassium-containing salt, a sodium-containing salt or a combination thereof, wherein said composition has enhanced herbicidal activity when compared with an otherwise identical composition lacking said potassium-containing salt, said sodium-containing salt or said combination thereof.

In one aspect there is provided use of a potassium-containing salt, sodium-containing salt or a combination thereof, for enhancing the herbicidal activity of a transition metal chelate (when compared with an otherwise identical transition metal chelate lacking said potassium-containing salt, said sodium-containing salt or said combination thereof).

In one aspect there is provided use of a potassium-containing salt, sodium-containing salt or a combination thereof, for enhancing the selective herbicidal activity of a transition metal chelate (when compared with an otherwise identical transition metal chelate lacking said potassium-containing salt, said sodium-containing salt or said combination thereof).

In one aspect the invention provides a method for controlling the growth of undesired vegetation, said method comprising providing:

a. a transition metal chelate; and b. a potassium-containing salt, a sodium-containing salt or a combination thereof; and c. contacting undesired vegetation with said transition metal chelate and said potassium-containing salt and/or said sodium-containing salt, wherein, following said contacting step, the undesired vegetation is destroyed.

In one aspect the invention provides a method for selectively controlling the growth of undesired vegetation, said method comprising providing:

a. a transition metal chelate; and a potassium-containing salt, a sodium-containing salt or a combination thereof; and b. contacting desired and undesired vegetation with said transition metal chelate and said potassium-containing salt and/or said sodium-containing salt, and wherein, following said contacting step, the undesired vegetation is preferentially destroyed while growth of the desired vegetation is relatively unharmed.

DETAILED DESCRIPTION

The present inventors have surprisingly discovered that use of a potassium-containing salt and/or a sodium-containing salt enhances (e.g. synergistically enhances) the herbicidal activity of a composition comprising a transition metal chelate.

Thus, in use of the invention, the potassium-containing salt and/or the sodium-containing salt enhances the herbicidal activity of the transition metal chelate.

The transition metal chelate component and the potassium-containing salt and/or the sodium-containing salt are applied to a selected target area containing undesired vegetation (and optionally desired vegetation) in a "herbicidal effective amount". Thus, when applied to the target area in said amount, the transition metal chelate is able to contact with and destroy undesired vegetation located within in the target area. Reference to 'destroys' is considered synonymous with, damaging beyond recovery, (terminally) inhibiting or eliminating growth of the undesired vegetation to which it is applied. When desired vegetation is also present in the target area, undesired vegetation is preferentially destroyed while growth of the desired vegetation is relatively unharmed. In this regard, should accidental damage of desired vegetation occur, this is typically of a transient nature and the desired vegetation is able to recover. Occasionally, a very low incidence of accidental injury or damage of desired vegetation may be observed. Whilst to be ideally avoided, a skilled person would appreciate that such observations are considered synonymous with the term 'unharmed/relatively unharmed' as used herein.

In the context of the present invention, desired vegetation refers to grass, lawn, and/or pastureland, and preferably refers to a grass (e.g. a lawn grass). Particular examples include Perennial ryegrass (*Lolium perenne* L.), Kentucky bluegrass (*Poa pratensis* L.), Chewings fescue (*Festuca rubra* spp. Commutate), Creeping fescue (*Festuca rubra* spp. *rubra/trichophylla*), Tall fescue (*Festuca arundinacea* Schreb.), Blue fescue (*Festuca glauca* Villars.), Colonial bentgrass (*Agrotis tenuis* Sibth), Annual bluegrass (*Poa annua* L.), Bermudagrass (*Cynodon dactylon*), Centipedegrass (*Eremochloa ophiuroides*), St. Augustinegrass (*Stenotaphrum secundatum*), and *Zoysia* grass (*Zoysia* spp.).

In the context of the present invention, undesired vegetation may comprise or consist of dandelions (e.g. *Taraxacum officinale*), false dandelions (e.g. *Hypochoeris radicata*), white clover (e.g. *Trifolium repens*), daisies (e.g. English daisy *Bellis perennis*), chickweed (e.g. *Stellaria media*), and black medick (e.g. *Medicago lupulina*), mosses, liverworts, ferns, horsetails, conifers, dicotyledonous plants, algae or combinations thereof. The undesired vegetation preferably comprises or consists of a dandelion, a white clover or a combination thereof.

The composition can be used in both residential and commercial plant or crop areas, and it is very effective against common weeds such as dandelions.

Transition metal chelates of, or for use in, the present invention may include any transition metal chelates disclosed in WO 03/073856 and/or WO 2011/154541 (the teaching of which is incorporated herein by reference). Alternatively or additionally, the transition metal chelates may be formed using any of the methods disclosed in WO 03/073856 and/or WO 2011/154541.

The transition metal chelate can be formed using various techniques known in the art. For example, the transition metal ions can be in the form of a transition metal salt, such as transition metal chlorides, transition metal sulfates, transition metal nitrates, transition metal citrates, transition metal phosphates, transition metal chelates, transition metal sulfides, transition metal sulfites, transition metal succinates, transition metal gluconates, transition metal lactates, transition metal formates, transition metal nitrites, transition metal salicylates, transition metal carboxylic acids, or in combinations of these salts. The chelating agent can also have various forms. In one embodiment, a chelating agent may be a free acid. In another embodiment the chelating agent may be a salt. Commercially available metal chelates can also be used.

Any suitable transition metal may be comprised in the transition metal chelate. In one embodiment the transition metal may comprise (or consist of) iron, copper, manganese, nickel, zinc or combinations thereof. Suitably, the transition metal for use in a transition metal chelate according to the invention may comprise (or consist of) iron.

Preferred chelating agents include EDTA, HEDTA, EDG, EDDS, GLDA, MGDA, isomers thereof, or combinations thereof, in particular EDTA and/or HEDTA.

In embodiments where an iron chelate is employed, the chelating agent may be selected from hydroxyethylenediaminetriacetic acid, ethylenediaminetetraacetic acid, diamino cyclohexane tetraacetic acid, ethylenediamine disuccinic acid, ethanoldiglycine, methylglycinediacetic acid, gluconic acid, glutamicaciddiacetic acid, aminotri(methylenephosphonic acid), ethanoldiglycine, hydroxyethyldiphosphonic acid, iminodisuccinic acid, hydroxy iminodisuccinic acid or combinations thereof and/or salts thereof, in particular FeEDTA and/or FeHEDTA. One of applicant's commercial products, FIESTA™ (which contains iron as an active ingredient, present as FeHEDTA) is preferred.

Enhanced Herbicidal Activity

An assessment of "herbicidal activity" can be made using a "vegetation damage assay" taught herein.

The "vegetation damage assay" comprises:

a. applying an amount of a composition or component thereof to an area of vegetation;
b. following application (e.g. after at least 7 or 14 days from application) assessing damage visually using a percentage rating scale from 0 (no injury) to 100% (death); and
c. calculating percentage control using the Henderson & Tilton formula.

In a preferred embodiment the undesirable vegetation is selected from dandelion and/or white clover (optionally the desirable vegetation is selected from perennial rye grass).

Herbicidal activity is typically acknowledged when an amount of a composition or component thereof (e.g. of a transition metal chelate herein) causes damage to vegetation that is rated at at least about 40% in the vegetation damage assay. A more commonly accepted herbicidal activity corresponds to damage to vegetation that is rated at at least about 50% or 60% in the vegetation damage assay. A preferred herbicidal activity corresponds to damage to vegetation that is rated at at least about 70% or 80% in the vegetation damage assay, and a desired herbicidal activity corresponds to damage to vegetation that is rated at at least about 90% in the vegetation damage assay.

As hereinbefore discussed, the presence of a potassium-containing salt and/or a sodium-containing salt enhances the herbicidal activity of a transition metal chelate. Said enhanced herbicidal activity may be readily confirmed via a simple comparative experiment employing the "vegetation damage assay" described above (and as illustrated in the Examples). In more detail, two compositions containing the same transition metal chelate (one composition including a potassium-containing salt and/or a sodium-containing salt, and the other composition not including said potassium-containing salt and/or said sodium-containing salt) are tested in parallel (under identical or otherwise experimentally equivalent conditions), and their respective vegetation damage scores are compared. To ensure optimal comparative testing, the amount of transition metal chelate applied per target area (i.e. grams of metal per $m^2$ or grams of metal chelate per $m^2$) should be the same for the two compositions being tested in parallel. By way of example, in one embodiment, the two compositions being tested employ the same concentration of transition metal chelate, and each composition is applied to an identical/equivalent target area ($m^2$).

In one embodiment, the presence of a potassium-containing salt and/or a sodium-containing salt enhances the herbicidal activity of a composition of the present invention by at least 5% (e.g. corresponding to at least a 5% score increase in a "vegetation damage assay" as described herein) when compared to an otherwise identical 'control' composition that does not comprise a potassium-containing salt and/or sodium-containing salt.

The present invention embraces adding a potassium-containing salt and/or sodium-containing salt to a transition metal chelate composition that has no or substantially no herbicidal activity, such that following said addition the composition is now capable of demonstrating herbicidal activity. This improvement is consistent with providing an enhanced herbicidal activity.

In one embodiment, the presence of a potassium-containing salt and/or a sodium-containing salt enhances the herbicidal activity of a composition of the present invention by at least 10% or by at least 15% (e.g. corresponding to at least a 10% or at least a 15% score increase in a "vegetation damage assay" as described herein) when compared to the corresponding 'control' composition (no potassium-containing salt and/or sodium-containing salt).

In another embodiment, the presence of a potassium-containing salt and/or sodium-containing salt enhances the herbicidal activity of a composition of the present invention by at least 20% or at least 30% (e.g. corresponding to at least a 20% or at least a 30% score increase in a "vegetation damage assay" as described herein) when compared to the corresponding 'control' composition (no potassium-containing salt and/or sodium-containing salt).

Suitably, the presence of a potassium-containing salt and/or sodium-containing salt enhances the herbicidal activity of a composition of the present invention by at least 40% or at least 50% (e.g. corresponding to at least a 40% or at least a 50% score increase in a "vegetation damage assay" as described herein) when compared to the corresponding 'control' composition (no potassium-containing salt and/or sodium-containing salt).

For the avoidance of any doubt, the aforementioned reference to a potassium-containing salt and/or a sodium-containing salt embraces the addition of only a potassium-containing salt, the addition of only a sodium-containing salt, or addition of a combination of each of said salts.

Similarly, for the avoidance of any doubt, the aforementioned reference to "enhanced herbicidal activity" in the context of a composition of the present invention embraces reference to the transition metal chelate component thereof and the use thereof.

In one embodiment of the present invention a composition typically comprises a transition metal chelate (e.g. an iron chelate) at a concentration of at least about 1% by weight to about 12% by weight.

In one embodiment of the present invention a composition of the invention may comprise a transition metal (suitably iron) present as metal chelate at a concentration of at least about 0.1% by weight to about 5% by weight.

In one embodiment, a composition of the invention may comprise a transition metal (suitably iron) present as metal chelate at a concentration between about 0.18% to about 5.0% by weight, suitably at a concentration between about 0.18% to about 3% by weight.

As discussed above, the addition of potassium-containing salts and/or sodium-containing salts enhance the herbicidal activity efficacy of a transition metal chelate. Therefore, it is not intended that the potassium-containing salt and/or sodium-containing salt is admixed with a transition metal chelate for the purpose (e.g. sole purpose) of adjusting the pH of said admixture.

Preferably a sodium-containing salt is selected from sodium chloride, hepes sodium salt, sodium acetate anhydrous, sodium acetate trihydrate, sodium azide, sodium β-glycerophosphate, sodium benzoate, sodium bicarbonate, sodium bisulphite, sodium borate decahydrate, sodium borohydride, sodium bromide, sodium carbonate anhydrous, sodium carbonate decahydrous, sodium carbonate monohydrous, sodium chlorite, sodium iodide, sodium nitrate, sodium nitrite, sodium silicate, sodium sulfate, sodium sulfite, sodium tripolyphosphate, sodium chloroacetate, sodium chlorate, sodium metabisulfite, sodium octanoate (NaC8), sodium nonanoate (NaC9), sodium decanoate (NaC10), sodium octadecanoate (NaC18), or combinations thereof.

Preferably a sodium-containing salt is selected from sodium chloride, hepes sodium salt, sodium acetate anhydrous, sodium acetate trihydrate, sodium azide, sodium β-glycerophosphate, sodium benzoate, sodium bicarbonate, sodium bisulphite, sodium borate decahydrate, sodium borohydride, sodium bromide, sodium carbonate anhydrous, sodium carbonate decahydrous, sodium carbonate monohydrous, sodium chlorite, sodium iodide, sodium nitrate, sodium nitrite, sodium silicate, sodium sulfate, sodium sulfite, sodium tripolyphosphate, sodium octanoate (NaC8), sodium nonanoate (NaC9), sodium decanoate (NaC10), sodium octadecanoate (NaC18), or combinations thereof.

Preferably a sodium-containing salt is selected from sodium chloride, hepes sodium salt, sodium acetate anhydrous, sodium acetate trihydrate, sodium azide, sodium β-glycerophosphate, sodium benzoate, sodium bicarbonate, sodium bisulphite, sodium borate decahydrate, sodium borohydride, sodium bromide, sodium carbonate anhydrous, sodium carbonate decahydrous, sodium carbonate monohydrous, sodium chlorite, sodium iodide, sodium nitrate, sodium nitrite, sodium silicate, sodium sulfate, sodium sulfite, sodium tripolyphosphate, or combinations thereof.

Preferably a sodium-containing salt is selected from sodium chloride, hepes sodium salt, sodium acetate anhydrous, sodium acetate trihydrate, sodium azide, sodium β-glycerophosphate, sodium benzoate, sodium bicarbonate, sodium bisulphite, sodium borate decahydrate, sodium borohydride, sodium bromide, sodium chlorite, sodium iodide, sodium nitrate, sodium nitrite, sodium silicate, sodium sulfate, sodium sulfite, sodium tripolyphosphate, (optionally sodium chloroacetate, sodium chlorate, or sodium metabisulfite) or combinations thereof.

Preferably a sodium-containing salt is selected from sodium chloride, hepes sodium salt, sodium acetate anhydrous, sodium acetate trihydrate, sodium azide, sodium β-glycerophosphate, sodium benzoate, sodium bisulphite, sodium borate decahydrate, sodium borohydride, sodium bromide, sodium chlorite, sodium iodide, sodium nitrate, sodium nitrite, sodium silicate, sodium sulfate, sodium sulfite, or sodium tripolyphosphate, (optionally sodium chloroacetate, sodium chlorate, or sodium metabisulfite) or combinations thereof.

Preferably a sodium-containing salt is selected from sodium chloride, sodium acetate anhydrous, sodium acetate trihydrate, sodium benzoate, sodium bicarbonate, sodium bisulphite, sodium borate decahydrate, sodium bromide, sodium chlorite, sodium nitrate, sodium nitrite, sodium silicate, sodium sulfate, sodium sulfite, or sodium tripolyphosphate, sodium chloroacetate, sodium chlorate, sodium metabisulfite, sodium octanoate (NaC8), sodium nonanoate (NaC9), sodium decanoate (NaC10), sodium octadecanoate (NaC18) or combinations thereof.

Preferably a sodium-containing salt is selected from sodium chloride, sodium acetate anhydrous, sodium acetate trihydrate, sodium benzoate, sodium bicarbonate, sodium bisulphite, sodium borate decahydrate, sodium bromide, sodium chlorite, sodium nitrate, sodium nitrite, sodium silicate, sodium sulfate, sodium sulfite, or sodium tripolyphosphate, sodium chloroacetate, sodium chlorate, sodium metabisulfite, or combinations thereof.

In one embodiment, a sodium-containing salt is not a sodium salt of a fatty acid (e.g. not sodium nonanoate). Alternatively or additionally, in one embodiment a sodium-containing salt is not a sodium salt of a chelating agent. Alternatively or additionally, in one embodiment a sodium-containing salt is not sodium carbonate.

Preferably a potassium-containing salt is selected from potassium chloride, potassium sulfate, potassium phosphate, potassium pelargonate, potassium citrate, potassium carbonate, potassium biphosphate, potassium nitrate, mono potassium phosphate, potassium thiosulfate, (optionally potassium amino acid complex or potassium chelate), potassium octanoate (KC8), potassium decanoate (KC10), potassium octadecanoate (KC18) or combinations thereof. In a preferred embodiment, the potassium-containing salt may be potassium chloride.

Preferably a potassium-containing salt is selected from potassium chloride, potassium sulfate, potassium phosphate, potassium pelargonate, potassium citrate, potassium carbonate, potassium biphosphate, potassium nitrate, mono potassium phosphate, potassium thiosulfate, (optionally potassium amino acid complex or potassium chelate), or combinations thereof. In a preferred embodiment, the potassium-containing salt may be potassium chloride.

Preferably a potassium-containing salt is selected from potassium chloride, potassium sulfate, potassium phosphate, potassium pelargonate, potassium citrate, potassium carbonate, potassium biphosphate, potassium nitrate, mono potassium phosphate, potassium thiosulfate, (optionally potassium amino acid complex), or combinations thereof. In a preferred embodiment, the potassium-containing salt may be potassium chloride.

Preferably a potassium-containing salt is selected from potassium chloride, potassium sulfate, potassium phosphate, potassium citrate, potassium carbonate, potassium biphosphate, potassium nitrate, potassium thiosulfate, potassium amino acid complex, potassium octanoate (KC8), potassium decanoate (KC10), potassium octadecanoate (KC18), or combinations thereof.

Preferably a potassium-containing salt is selected from potassium chloride, potassium sulfate, potassium phosphate, potassium citrate, potassium carbonate, potassium biphosphate, potassium nitrate, potassium thiosulfate, potassium amino acid complex, or combinations thereof.

In one embodiment, a potassium-containing salt is not a potassium salt of a fatty acid (e.g. nonanoate). Preferably, a potassium-containing salt is not potassium nonanoate. Alternatively or additionally, a potassium-containing salt is not a potassium salt of a chelating agent.

The potassium-containing salt and/or sodium-containing salt may be added to the herbicidal composition at the time of formulation, or it can be provided as a separate composition that is admixed with one or more further ingredient(s) prior to or during application to vegetation. Alternatively or additionally, said potassium-containing salt and/or sodium-containing salt may be applied separately to vegetation.

In one embodiment the potassium-containing salt may be a chlorinated potassium-containing salt. In another embodiment, the sodium-containing salt may be a chlorinated sodium-containing salt. In a further embodiment, the potassium-containing salt may be a chlorinated potassium-containing salt and the sodium-containing salt may be a chlorinated sodium-containing salt.

A composition of the present invention may comprise a potassium-containing salt and a sodium-containing salt at a concentration between about 0.5% to about 25% by weight, suitably at a concentration between about 1% to about 25% by weight. Suitably a composition the present invention may comprise a potassium-containing salt and a sodium-containing salt at a concentration of between about 5% to about 25% by weight or between about 10% to about 25%.

In another embodiment a composition the present invention may comprise a potassium-containing salt and a sodium-containing salt at a concentration between about 0.5% to about 15% by weight, suitably at a concentration between about 0.5%, to about 10% by weight.

In a further embodiment a composition of the present invention may comprise a potassium-containing salt and a sodium-containing salt at a concentration between about 0.01% to about 25% by weight, or between about 1% to about 22% by weight. Suitably between about 5% to about 20% by weight, more suitably between about 10% to about 15% by weight.

In a yet further embodiment a composition of the present invention may comprise a potassium-containing salt and a sodium-containing salt at a concentration of at least 5% by weight or at least 10% by weight. Suitably, a composition of the present invention may comprise the use of a potassium-containing salt and a sodium-containing salt at a concentration of at least 15% by weight or at least 20% by weight. In some embodiments a composition of the present invention may comprise a potassium-containing salt and a sodium-containing salt at a concentration of at least 25% or at least 30% by weight.

A composition of the present invention may comprise a sodium-containing salt or a potassium-containing salt at a concentration between about 0.5% to about 25% by weight, suitably at a concentration between about 1% to about 25% by weight. Suitably a composition of the present invention may comprise a sodium-containing salt or a potassium-containing salt at a concentration of between about 5% to about 25% by weight or between about 10% to about 25%.

In another embodiment a composition of the present invention may comprise a sodium-containing salt or a potassium-containing salt at a concentration between about 0.5% to about 15% by weight, suitably at a concentration between about 0.5% to about 10% by weight.

In a further embodiment a composition of the invention may comprise a sodium-containing salt or a potassium-containing salt at a concentration between about 0.01% to about 25% by weight, or between about 1% to about 22% by weight. Suitably between about 5% to about 20% by weight, more suitably between about 10% to about 15% by weight.

In a yet further embodiment a composition of the present invention may comprise a sodium-containing salt or a potassium-containing salt at a concentration of at least 5% by weight or at least 10% by weight. Suitably, a composition of the invention may comprise a sodium-containing salt or a potassium-containing salt at a concentration of at least 15% by weight or at least 20% by weight. In some embodiments a composition of the invention may comprise a sodium-containing salt or a potassium-containing salt at a concentration of at least 25% or at least 30% by weight.

Optionally, a composition of the invention (e.g. a composition comprising a potassium-containing salt) may comprise no (or substantially no) sodium-containing salt. For example, a composition of the invention may not comprise a sodium-containing salt selected from sodium chloride, hepes sodium salt, sodium acetate anhydrous, sodium acetate trihydrate, sodium azide, sodium β-glycerophosphate, sodium benzoate, sodium bicarbonate, sodium bisulphite, sodium borate decahydrate, sodium borohydride, sodium bromide, sodium carbonate anhydrous, sodium carbonate decahydrous, sodium carbonate monohydrous, sodium chlorite, sodium iodide, sodium nitrate, sodium nitrite, sodium silicate, sodium sulfate, sodium sulfite, or sodium tripolyphosphate, sodium chloroacetate, sodium chlorate, sodium metabisulfite, sodium octanoate (NaC8), sodium nonanoate (NaC9), sodium decanoate (NaC10), sodium octadecanoate (NaC18), or combinations thereof. Suitably a composition of the invention may not comprise a sodium-containing salt selected from sodium chloride, hepes sodium salt, sodium acetate anhydrous, sodium acetate trihydrate, sodium azide, sodium β-glycerophosphate, sodium benzoate, sodium bicarbonate, sodium bisulphite, sodium borate decahydrate, sodium borohydride, sodium bromide, sodium carbonate anhydrous, sodium carbonate decahydrous, sodium carbonate monohydrous, sodium chlorite, sodium iodide, sodium nitrate, sodium nitrite, sodium silicate, sodium sulfate, sodium sulfite, or sodium tripolyphosphate, or combinations thereof. Suitably, a composition of the invention (e.g. a composition comprising a potassium-containing salt) may not comprise sodium chloride.

The term "substantially no" as used in this context means less than 0.01% or less than 0.001% sodium-containing salt by weight. Preferably the term "suitably no" may mean less than 0.0001% sodium-containing salt by weight.

The end-use concentration of the ingredients of the herbicidal compositions of the present invention may vary depending on the form of the metal chelate and the potassium-containing salt and/or sodium-containing salt.

When referring to the amount, e.g., concentration and molar ratio, of the metal component in the composition, the amount is based on the amount of metal ions present within the metal component.

The compositions of the invention may be formulated as a liquid formula, a dry granule, a liquid concentrate, or a dry concentrate.

In one embodiment a composition of the invention may be provided as a dry concentrate that is dissolved in water before application to vegetation.

In another embodiment a composition of the invention may be provided as a liquid concentrate that is diluted with water before application to vegetation.

In a further embodiment a composition of the invention may be provided as a dry granule that is applied directly to the vegetation.

In one embodiment, a composition of the invention may be formulated as a ready-to-use formulation. Such formulations may take the form of liquid or dry RTU formulations (preferably a liquid RTU formulation).

The solvents used in the ready-to-use liquid composition and liquid concentrate forms can vary. In one embodiment the solvent may be a poor wetting agent on plant leaves, essentially equal to that of water. Grass leaves are often vertical and hard to wet, whereas many weeds, such as the dandelion, are horizontal and easier to wet. Without wishing to be bound by theory, solutions that are poor wetting agents are believed to be advantageous as they tend to bead up and run off of grass leaves, while spreading onto leaves of the horizontal weeds, such as dandelion weeds. Suitably, a solvent used in the formulation of the disclosed herbicidal compositions may be selected from propylene glycol, glycerin, alcohols (e.g. tetrahydrofurfuryl alcohol (THFA)) or combinations thereof.

In one embodiment a RTU composition of the invention (e.g. a liquid RTU composition) may comprise a transition metal chelate (e.g. an iron chelate) at a concentration of at least 1% by weight (e.g. up to about 12% by weight). Suitably a transition metal chelate (suitably iron) may be present at a concentration of at least 3% by weight, more suitably at least about 5% by weight. A preferred RTU liquid formulation of the present invention comprises between 1% and 2% (approximately 1.5%) by weight iron chelate (e.g. FeHEDTA or FeEDTA). In other embodiments a RTU composition of the invention may comprise a transition metal chelate (e.g. an iron chelate) at a concentration of at least 7% by weight, suitably at least 10% by weight.

In one embodiment a metal chelate may be present within a RTU composition of the invention (e.g. a solid RTU composition) at a concentration between about 3% to about 12% by weight. Suitably, the metal chelate may be present at a concentration between about 3% to about 10% or between about 3% to about 8%. One preferred RTU solid formulation of the present invention (e.g. a fertilizer-based formulation) comprises between about 6% and about 8% by weight (approximately 7% by weight) iron chelate (e.g. FeEDTA or FeHEDTA). Another preferred RTU solid formulation of the present invention (e.g. a solid bait) comprises between about 3% and 6% by weight (approximately 4.8% by weight) iron chelate (e.g. FeEDTA or FeHEDTA).

In other embodiments the metal chelate may be present in a RTU composition at a concentration between about 5% to about 12% by weight, suitably between about 7% to about 12% by weight.

In one embodiment a RTU composition of the invention may comprise a transition metal (suitably iron) present as a metal chelate at a concentration of at least 0.1% by weight. Suitably a transition metal (suitably iron) may be present at a concentration of at least 1% by weight, more suitably at least about 5% by weight.

In one embodiment a transition metal (suitably iron) present as a metal chelate may be present in a RTU composition of the present invention at a concentration between about 0.18% to about 5.0% by weight, suitably at a concentration between about 0.18% to about 3% by weight. Suitably the transition metal may be present at a concentration of between about 0.2% to about 2.0% by weight.

In another embodiment, a transition metal (suitably iron) present as a metal chelate may be present in a RTU composition of the present invention at a concentration between about 1% to about 5.0% by weight, suitably at a concentration between about 2% to about 5% by weight.

In a further embodiment, a RTU composition may comprise a transition metal (suitably iron) present as a metal chelate at a concentration between about 0.2% to about 1.5% by weight, suitably between about 0.2% to about 1% or between about 0.5% to about 1.5% by weight.

A RTU composition of the present invention may comprise a potassium-containing salt and/or a sodium-containing salt as hereinbefore described.

Alternatively or in addition to the above ingredients, in one embodiment a composition of the invention may be formulated with one or more further components. For example, the composition may be formulated with one or more component selected from growth regulators, fertilizers, herbicides, thickening agents, humectants, antioxidants, stabilizing agents, wetting agents, sequestrants, solvents, dyes, or combinations thereof.

Suitable humectants may include propylene glycol, glycerin, beet molasses, or combinations thereof. Suitable antioxidants may include citric acid. Suitable stabilizing agents may include citric acid, ammonium compounds, or combinations thereof. Suitable wetting agents may include carboxylic acids (or salts thereof) or silicone polymers (e.g. Silwet 77 (Witco Corp, CT, USA)). Suitable preservatives may include Kathon® (a mixture of 5-chloro-2-methyl-4-isothiazolin-3-one and 2-methyl-4-isothiazolin-3-one, made by Rohm & Haas of Hayward, CA), sorbic acid, sodium benzoate, sodium propionate, parabens, isopropyl alcohol, ethanol or combinations thereof. The end-use concentration of such additives may vary, but in some embodiments, the concentration may be between about 0.1 to about 5% by weight.

A variety of fertilizers can be added to the herbicidal composition of the present invention. Preferably, the fertilizer is a nitrogen-containing fertilizer that is effective to promote the rapid growth of grass, thereby allowing the grass to shade and out-compete the damaged weeds.

Suitably the composition of the invention may be formulated with a fertilizer, such as a fertilizer selected from urea ammonium nitrate, ammonium sulfate, leather meal, bone meal, plant meals, ammonium potassium phosphate, or combinations thereof.

Any end use concentration of a fertilizer is contemplated in the present invention. In one embodiment a fertilizer may be added to a composition of the present invention with an end use concentration in the range of about 20% to about 80% by weight, suitably in the range of about 50 to about 75% by weight, preferably in the range of 60 to 75% by weight.

In some embodiments one or more growth regulators may be added to a composition of the present invention. By way of non-limiting example, the growth regulators added to the herbicidal compositions may include maleic hydrazide (MH), cycocel (2-chloroethyl-trimethyl ammonium chloride), auxin derivatives, and combinations thereof. The end-use concentration of the additional growth regulators can vary. In one embodiment the concentration may be between about 100 ppm to about 2% by weight.

The herbicidal compositions of the present invention may also include natural growth regulators, such as for example, salicylic acid, salts of salicylic acid including ammonium salicylate, jasmonates, ethylene, auxins, gibberellins, cytokinins, abscisic acid, or combinations thereof. The end-use concentration of these natural growth regulators can vary, but in some embodiments may be between about 10 ppm to about 5% by weight.

In addition to the transition metal chelates disclosed herein, a composition of the invention may comprise one or more further herbicidally effective ingredients (e.g. a co-active ingredient). In one embodiment the one or more further herbicidally effective ingredients may be selected from glyphosate, glufosinate, ammonium pelargonate, pelargonic acid, medium chain fatty acids and their salts, urea, sodium, borax, copper sulfate, carboxylic acids or the salts thereof, ammonium compounds, calcium compounds, or combinations thereof. The end-use concentration of the additional herbicide(s) can vary, but in some embodiments, the concentration may be between about 0.5% to about 5% by weight, suitably between about 2% to about 5% by weight.

Furthermore, a variety of thickening agents may be added to the herbicidal compositions disclosed herein. Suitable thickening agents may include Rhodopol 23 (Rhone Poulenc), VanGel B (R. T. Vanderbilt), Kelzan S (Merck & Co.), guar gum, propylene glycol, glycerol, and combinations thereof. The end-use concentration of added thickening agent(s) can vary, but in some embodiments may be in the range of between about 0.01% to about 10% by weight.

The herbicidal compositions of the present invention are effective over a wide range of pH values. The person skilled in the art is capable of determining an optimal pH of a composition of the invention. For example, once a composition of the invention has been appropriately formulated, the pH of the solution may be measured and adjusted as necessary. The pH values can be measured using standard techniques. For example using a pH meter (suitably a pH meter with glass bulb electrodes).

In one embodiment, the pH of a composition of the present invention may be between about pH 1.5 to about pH 10. Suitably the pH of a composition of the invention may be between about pH 4 to about pH 8.

In one embodiment a liquid ready-to-use (RTU) formulation according to the present invention may comprise (or consist of):

| |
|---|
| 1.5% FeHEDTA |
| 1.5% potassium chloride |
| 0.08% sodium citrate stabilizer |
| 0.07% Kathon CG preservative |
| 96.85% deionized water |

Further additives, if used, such as fertilizers may be admixed with further agitation.

In another embodiment a (RTU) formulation according to one embodiment of the present invention may comprise (or consist of):

| |
|---|
| 7.0% FeEDTA |
| 20.0% potassium chloride |
| 28.0% bone and plant meals |
| 25.0% ammonium sulfate |
| 20% powdered sugar |

In one embodiment a liquid ready-to-use (RTU) formulation according to the present invention may comprise (or consist of):

| |
|---|
| 1.5% FeHEDTA |
| 2.0% sodium sulfate |
| 0.08% sodium citrate stabilizer |
| 0.07% Kathon CG preservative |
| 96.35% deionized water |

Further additives, if used, such as fertilizers may be admixed with further agitation.

In another embodiment a (RTU) formulation according to one embodiment of the present invention may comprise (or consist of):

| |
|---|
| 7.0% FeEDTA |
| 20.0% sodium sulfate |
| 28.0% bone and plant meals |
| 25.0% ammonium sulfate |
| 20% powdered sugar |

The RTU formulation may be prepared by admixing water and FeHEDTA concentrate with agitation. Once thoroughly mixed, potassium chloride, stabilizer sodium citrate, and preservative Kathon CG may be admixed and the composition agitated until the solution is homogeneous.

In one embodiment, a RTU formulation of the invention may be applied to undesired vegetation and optionally to desired vegetation (e.g. sprayed, using a hand sprayer, for example) at various rates.

In one embodiment, the solution may be applied (e.g. sprayed) to undesired vegetation and optionally to desired vegetation at a rate in the range of about 0.2 g $Fe/m^2$ to 2.0 g $Fe/m^2$. Suitably, the solution may be applied (e.g. sprayed) in the range of about 0.25 g $Fe/m^2$ to 1.8 g $Fe/m^2$, more preferably at a rate of about 0.5 g $Fe/m^2$.

When applied to undesired vegetation alone (or where loss of residual desired vegetation is not important) higher application rates may be employed, such as greater than 2.0 g $Fe/m^2$. For example, application rates in the region of 3-5 g $Fe/m^2$ or greater may be employed.

In some embodiments a RTU dry formulation may be prepared by admixing a potassium salt (such as potassium chloride or potassium sulfate) and/or a sodium salt and a dry Fe chelate powder.

Further additives, if used, such as fertilizers may be admixed to give 0.2 to 2.0% Fe by weight of the final RTU composition. In some embodiments, where a RTU dry formulation is used, said formulation may be applied to both desired and undesired vegetation using a spreader or any other application equipment at various rates. In one embodiment, the formulation may be applied at a rate in the range of 0.25 to 1.8 g $Fe/m^2$, suitably at a rate of about 0.5 g $Fe/m^2$.

The term "selectively herbicidal" (aka "selectively treating/controlling undesired vegetation") as used herein means that a composition of the present invention is capable of destroying undesired vegetation to which it is applied, whilst leaving desired vegetation unharmed or relatively unharmed. The term "selective herbicide" is opposite to "non-selective herbicide", which destroy all or substantially all vegetation to which it is applied, irrespective of whether said vegetation is desired or undesired vegetation.

An assessment of "selective herbicidal activity" can be made using a "selective herbicide assay" as taught herein.

The "selective herbicide assay" comprises:

a. applying an amount of a composition or component thereof to an area of undesired vegetation and desired vegetation;
b. following application (e.g. after at least 7 or 14 days from application) assessing plant damage visually using a percentage rating scale from 0 (no injury) to 100% (death); and
c. calculating percentage control using the Henderson & Tilton formula for the undesired vegetation and desired vegetation.

In a preferred embodiment the undesirable vegetation is selected from dandelion and/or white clover, and the desirable vegetation is selected from perennial rye grass.

A "selective herbicide activity" is typically acknowledged when an amount of a composition or component thereof (e.g. a transition metal chelate herein) scores a rating of at least about 40% (suitably at least about 50%, 60% or 70%) when applied to undesired vegetation, and scores a rating of less than about 15% when applied to desired vegetation.

In one embodiment a selective herbicidal activity corresponds to a rating of at least about 40% when applied to undesired vegetation, and scores a rating of less than about 10% or 5% (suitably less than about 1%) when applied to desired vegetation.

In one embodiment a selective herbicidal activity corresponds to a rating of at least about 60% when applied to undesired vegetation, and scores a rating of less than about 10% or 5% (suitably less than about 1%) when applied to desired vegetation.

In one embodiment a selective herbicidal activity corresponds to a rating of at least about 80% when applied to undesired vegetation, and scores a rating of less than about 10% or 5% (suitably less than about 1%) when applied to desired vegetation.

In one embodiment a selective herbicidal activity corresponds to a rating of at least about 90% when applied to undesired vegetation, and scores a rating of less than about 10% or 5% (suitably less than about 1%) when applied to desired vegetation.

In one embodiment a selective herbicidal activity corresponds to a rating of at least about 95% when applied to undesired vegetation, and scores a rating of less than about 10% or 5% (suitably less than about 1%) when applied to desired vegetation.

As hereinbefore discussed, the presence of a potassium-containing salt and/or a sodium-containing salt may simultaneously enhance the selective herbicidal activity of a transition metal chelate. Said enhanced selective herbicidal activity may be readily confirmed via a simple comparative experiment employing the "selective herbicide assay" described above (and as illustrated in the Examples). In more detail, two compositions containing the same transition metal chelate (one composition including a potassium-containing salt and/or a sodium-containing salt, and the other composition not including said potassium-containing salt and/or said sodium-containing salt) are tested in parallel (under identical or otherwise experimentally equivalent conditions), and their respective undesired vegetation damage and desired vegetation scores are compared. To ensure optimal comparative testing, the amount of transition metal chelate applied per target area (i.e. grams of metal per $m^2$ or grams metal chelate per $m^2$) should be the same for the two compositions being tested in parallel. By way of example, in one embodiment, the two compositions being tested employ the same concentration of transition metal chelate, and each composition is applied to an identical/equivalent target area ($m^2$).

The term "enhanced selective herbicidal activity" as used herein is confirmed (for example, via the "selective herbicide assay" herein) when a composition of the invention demonstrates an increased difference between the % damage scores to desired vegetation and undesired vegetation when compared to the corresponding difference recorded for a 'control' composition comprising the same transition metal chelate lacking said potassium-containing salt and/or said sodium-containing salt. To ensure optimal comparative assessment, identical metal chelate ($g/m^2$) application rates should be employed (as discussed hereinbefore, for example with reference to the "vegetation damage assay").

In other words, if (hypothetically) a composition of the present invention scores a rating of 40% activity against undesired vegetation and a score of 15% against desired vegetation (e.g. as determined in the "selective herbicide assay" herein) providing a difference of 25%, whereas if (hypothetically) a 'control' composition (otherwise identical though lacking said potassium-containing salt and/or said sodium-containing salt) scores a rating of 35% activity against undesired vegetation and a score of 18% against desired vegetation (e.g. as determined in the "selective herbicide assay" herein) providing a difference of 17%, then comparatively the composition of the invention would be considered to have enhanced selectively herbicidal activity.

Thus, in one embodiment the term "enhanced selective herbicidal activity" as used herein means that a composition of the invention provides an increase in the difference between the % damage to desired vegetation and undesired vegetation (e.g. as determined in the "selective herbicide assay" herein) of at least about 1% or at least about 3% when compared with the corresponding 'control' composition (otherwise identical though lacking said potassium-containing salt and/or said sodium-containing salt).

In another embodiment the term "enhanced selective herbicidal activity" as used herein means that a composition of the invention provides an increase in the difference between the 25% damage to desired vegetation and undesired vegetation (e.g. as determined in the "selective herbicide assay" herein) of at least about 5% or at least about 10% when compared with the corresponding 'control' composition (otherwise identical though lacking said potassium-containing salt and/or said sodium-containing salt).

Suitably, the term "enhanced selective herbicidal activity" as used herein means that a composition of the invention provides an increase in the difference between the % damage to desired vegetation and undesired vegetation (e.g. as determined in the "selective herbicide assay" herein) of at least about 20% or at least about 30% or at least about 50% when compared with the corresponding 'control' composition (otherwise identical though lacking said potassium-containing salt and/or said sodium-containing salt).

Suitably, the term "enhanced selective herbicidal activity" as used herein means that a composition of the invention provides an increase in the difference between the % damage to desired vegetation and undesired vegetation (e.g. as determined in the "selective herbicide assay" herein) of at least about 70% or at least about 80% when compared with the corresponding 'control' composition (otherwise identical though lacking said potassium-containing salt and/or said sodium-containing salt).

For the avoidance of any doubt, the aforementioned reference to a potassium-containing salt and/or a sodium-containing salt embraces the addition of only a potassium containing salt, the addition of only a sodium-containing salt, or addition of a combination of each of said salts.

Similarly, for the avoidance of any doubt, the aforementioned reference to "enhanced selective herbicidal activity" in the context of a composition of the present invention embraces reference to the transition metal chelate component thereof and the use thereof.

The present invention also provides a method for controlling the growth of undesired vegetation and/or for selectively controlling/treating undesired vegetation, as hereinbefore described.

In one embodiment a herbicidal composition of the present invention may be employed in said methods.

Alternatively or additionally, a transition metal chelate and a potassium-containing salt and/or sodium containing salt may be employed in said methods. For example, the methods of the invention may be carried out by contacting undesired vegetation (and optionally desired vegetation) with the transition metal chelate component either simultaneously with, prior to or subsequent to the potassium-containing salt and/or the sodium-containing salt component. In use, said transition metal component and said potassium-containing salt and/or the sodium-containing salt combine/cooperate and thereby deliver a herbicidal effective amount of transition metal chelate to the undesired vegetation. Said herbicidal effective amount is typically measured in terms of grams metal/$m^2$ (e.g. Fe g/$m^2$) as hereinbefore described.

The term "contacting" as used in reference to a method of the invention encompasses all methods for contacting or applying a composition, or transition metal chelate and potassium-containing salt and/or sodium-containing salt to an area of vegetation known to the person skilled in the art. Contacting may include contacting vegetation directly and/or contacting the ground in which said vegetation is present.

Preferably a composition, or transition metal chelate and potassium-containing salt and/or sodium-containing salt is applied to the top growth, or portion(s) of the undesired vegetation (and optionally to the desired vegetation) located above the soil surface.

In one embodiment, contacting may include spraying. Accordingly, the metal chelate component and the salt component are sprayed on undesired vegetation (and optionally on desired vegetation). This application may encompass both spraying the vegetation directly (e.g. on the top growth, or portion(s) of the plant located above the soil surface) and/or spraying the ground in which said vegetation is present.

In one embodiment the metal chelate component and the salt component are provided as a dry concentrate that is dissolved in water before application to vegetation.

In one embodiment the metal chelate component and the salt component are provided as a liquid concentrate that is diluted with water before application to vegetation.

In one embodiment the metal chelate component and the salt component are provided as a dry granule that is applied directly to the vegetation.

In one embodiment the metal chelate component and the salt component are applied to a grass lawn. Thereafter, the present invention selectively controls the growth of undesirable vegetation (as hereinbefore described) that may be present within the grass lawn.

Advantages

The present inventors have surprisingly found that the presence of potassium-containing salts and/or sodium-containing salts when employed in combination with a transition metal chelate demonstrate improved herbicidal properties (e.g. improved selectively herbicidal properties). Without wishing to be bound by any theory, the present inventors believe that the added potassium-containing salt and/or sodium-containing salt component of the present invention help improve metal (e.g. iron) chelate uptake by undesired vegetation (as hereinbefore defined) by precipitating calcium ions (that would be antagonistic with metal) available in water and/or on the leaf surface of undesired vegetation.

The inventors have demonstrated the enhancement of herbicidal activity (e.g. enhanced selectively herbicidal activity)—see the accompanying Examples. Such enhancement may advantageously be a synergistic enhancement.

By providing a composition having enhanced herbicidal activity (e.g. enhanced selectively herbicidal activity) a reduced amount of said composition needs to be used when contacting an area of undesired vegetation and/or an area of undesired vegetation and desired vegetation. Advantageously, the ability to use a reduced amount of said composition reduces costs associated with contacting an area of undesired vegetation and/or an area of undesired vegetation and desired vegetation, and/or results in improved efficiency of said composition. Also, a composition having enhanced selectively herbicidal activity may mean that an increased concentration of said composition can be applied to an area of undesired and desired vegetation, advantageously resulting in increased damage and/or kill and/or inhibition of growth of undesired vegetation and whilst demonstrating relatively reduced damage and/or kill and/or inhibition of growth of desired vegetation.

This disclosure is not limited by the exemplary methods and materials disclosed herein, and any methods and materials similar or equivalent to those described herein can be used in the practice or testing of embodiments of this disclosure. Numeric ranges are inclusive of the numbers defining the range.

Suitable chelating agents of the present invention are described below.

A chelating agent is an organic molecule that can trap or encapsulate certain trace metal cations to prevent the cations from entering into unwanted chemical reactions and forming insoluble salts. Without wishing to be bound by theory, the chelating agent complexes the metal ions into a soluble but bound form, thus forming a metal chelate that is highly soluble in water and that can be readily taken up by vegetation.

Various chelating agents can be used to form the metal chelate. Typically, a chelating agent is a substance in which the molecules thereof form more than one bond to a single metal ion. In other words, a chelating agent is typically a multidentate ligand.

In one embodiment a chelating agent may be selected from aconitic acid, alanine diacetic acid (ADA), alkoyl ethylene diamine triacetic acids (e.g., lauroyl ethylene diamine triacetic acids (LED3A), aminotri(methylenephosphonic acid) (ATMP), asparticaciddiacetic acid (ASDA), asparticacidmonoacetic acid, diamino cyclohexane tetraacetic acid (CDTA), citraconic acid, citric acid, 1,2-diaminopropanetetraacetic acid (DPTA-OH), 1,3-diamino-2-propanoltetraacetic acid (DTPA), diethanolamine, diethanol glycine (DEG), diethylenetriaminepentaacetic acid (DTPA), diethylene triamine pentamethylene phosphonic acid (DTPMP), diglycolic acid, dipicolinic acid (DPA), ethanolaminediacetic acid, ethanoldiglycine (EDG), ethionine, ethylenediamine (EDA), ethylenediaminediglutaric acid (EDDG), ethylenediaminedi(hydroxyphenylacetic acid (EDDHA), ethylenediaminedipropionic acid (EDDP), ethylenediaminedisuccinate (EDDS), ethylenediaminemonosuccinic acid (EDMS), ethylenediaminetetraacetic acid (EDTA), ethylenediaminetetrapropionic acid (EDTP), ethyleneglycolaminoethylestertetraacetic acid (EGTA), gallic acid, glucoheptonic acid, gluconic acid, glutamicaciddiacetic acid (GLDA), glutaric acid, glyceryliminodiacetic acid, glycinamidedisuccinic acid (GADS), glycoletherdiaminetetraacetic acid (GEDTA), 2-hydroxyethyldiacetic acid, hydroxyethylenediaminetriacetic acid (HEDTA), hydroxyethyldiphosphonic acid (HEDP), 2-hydroxyethyl imino diacetic acid (HIMDA), hydroxyiminodiacetic acid (HIDA), hydroxy iminodisuccinic acid (HIDS), 2-hydroxy propylene diamine disuccinic acid (HPDDS), iminodiacetic acid (IDA), iminodisuccinic acid (IDS), itaconic acid, lauroyl ethylene diamine triacetic acids (LED3A), malic acid, malonic acid, methylglycinediacetate (MGDA), methyliminodiacetic acid (MIDA), monoethanolamine, nitrilotriacetic acid (NTA), nitrilotripropionic acid (NPA), N-phosphonomethyl glycine (glyphosate), propyldiamine tetraacetic acid (PDTA), salicylic acid, serinediacetic acid (SDA), sorbic acid, succinic acid, sugars, tartaric acid, tartronic acid, triethanolamine, triethylenetetraamine, triethylene tetraamine hexaacetic acid (TTHA), (or salts thereof) or combinations thereof.

In another embodiment a chelating agent may be selected from 2-propanoltetraacetic acid, diethylenetriaminepentaacetic acid, ethanolaminediacetic acid, ethanoldiglycine, ethionine, ethylenediaminediglutaric acid, ethylenediaminedihydroxyphenylacetic acid, ethylenediaminedipropionic acid, ethylenediaminedisuccinic acid, ethylenediaminemonosuccinic acid, acid, 1,3-diamino-2-propanoltetraacetic acid, diethylenetriaminepentaacetic acid, ethanolaminediacetic acid, ethanoldiglycine, ethionine, ethylenediaminediglutaric acid, ethylenediaminedihydroxyphenylacetic acid, ethylenediaminedipropionic acid, ethylenediaminedisuccinic acid, ethylenediaminemonosuccinic acid, ethylenediaminetetraacetic acid, ethyleneglycolaminoethylestertetraacetic acid, glutamicaciddiacetic acid, glyceryliminodiacetic acid, glycinamidedisuccinic acid, glycoletherdiaminetetraacetic acid, 2-hydroxyethyldiacetic acid, hydroxyethylenediaminetriacetic acid, hydroxyiminodiacetic acid, iminodiacetic acid, iminodisuccinic acid, lauroyl ethylene diamine triacetic acid, methylglycinediacetic acid, methyliminodiacetic acid, nitrilotriacetic acid, nitrilotripropionic acid, salicylic acid, serinediacetic acid (or the salts thereof) or combinations thereof.

Other suitable chelating agents include aminopolycarboxylic acid, amines, amides, phosphonic acid, or combinations thereof. Amino acids may also be used as chelating agents. Suitable amino acids may include alanine, arginine, asparagine, aspartic acid, glutamic acid, glutamine, glycine, histidine, isoleucine, leucine, lysine, methionine, proline, serine, threonine, tyrosine, valine, or combinations thereof. Other chelating agents that may be used include beet molasses, carboxylic acids or the salts thereof, salicylic acid or the salts thereof (such as ammonium salicylate), citric acid, or combinations thereof.

In certain embodiments, chelating agents that are more readily biodegradable may be used in the compositions of the invention. Such chelating agents may include ATMP, EDG, EDDS, GLDA, HEDP, MGDA, IDS, or HIDS. Other readily biodegradable chelating agents may include citric acid, gallic acid, glutaric acid, malic acid, salicylic acid, sorbic acid, succinic acid, sugars, tartaric acid or combinations thereof. Alternatively or additionally, such biodegradable chelating agents may be selected from alanine, arginine, asparagine, aspartic acid, glutamic acid, glutamine, glycine, histidine, isoleucine, leucine, lysine, methionine, proline, serine, threonine, tyrosine, valine or combinations thereof.

In one embodiment the chelator comprised in the transition metal chelate may comprise (or consist of) an aminopolycarboxylate chelating agent. Suitably, an aminopolycarboxylate chelating agent may be selected from hydroxyethylenediaminetriacetic acid, ethylenediaminetetraacetic acid, diamino cyclohexane tetraacetic acid, ethylenediamine disuccinic acid, ethanoldiglycine, methylglycinediacetic acid, glutamicaciddiacetic acid, or combinations thereof and/or salts thereof.

In another embodiment a chelating agent may be selected from diamino cyclohexane tetra-acetic acid, ethylenediaminedisuccinic acid, ethylenediaminetetraacetic acid, ethanol-diglycine, hydroxyethylenediaminetriacetic acid, methylglycinediacetic acid, glutamic-aciddiacetic acid, diethylenetriaminepentaacetic acid, iminodisuccinic acid, their salts, or combinations thereof.

In one embodiment a composition of the invention may comprise: a transition metal component, a chelating agent selected from alanine diacetic acid, alkoyl ethylene diamine triacetic acid, aminotri(methylenephosphonic acid), asparticaciddiacetic acid, asparticacidmonoacetic acid, diamino cyclohexane tetraacetic acid, citraconic acid, citric acid, 1,2-diaminopropanetetraacetic acid, 1,3-diamino-2-propanoltetraacetic acid, diethylenetriaminepentaacetic acid, ethanolaminediacetic acid, ethanoldiglycine, ethionine, ethylenediaminediglutaric acid, ethylenediaminedihydroxyphenylacetic acid, ethylenediaminedipropionic acid, ethylenediaminedisuccinic acid, ethylenediaminemonosuccinic acid, ethylenediaminetetraacetic acid, ethyleneglycolaminoethylestertetraacetic acid, glutamicaciddiacetic acid, glyceryliminodiacetic acid, glycinamidedisuccinic acid, glycoletherdiaminetetraacetic acid, 2-hydroxyethyldiacetic acid, hydroxyethylenediaminetriacetic acid, hydroxyiminodiacetic acid, iminodiacetic acid, iminodisuccinic acid, lauroyl ethylene diamine triacetic acid, methylglycinediacetic acid, methyliminodiacetic acid, nitrilotriacetic acid, nitrilotripropionic acid, salicylic acid, serinediacetic acid (or salts thereof) or combinations thereof; and a potassium-containing salt, a sodium-containing salt or a combination thereof (preferably a potassium-containing salt).

In another embodiment a composition of the invention may comprise:

a transition metal chelate formed from a transition metal (e.g. selected from iron, copper, or mixtures thereof) and a chelating agent selected from diamino cyclohexane tetra-acetic acid, ethylenediaminedisuccinic acid, ethylenediaminetetraacetic acid, ethanol-diglycine, hydroxyethylenediaminetriacetic acid, methylglycinediacetic acid, glutamic-aciddiacetic acid, diethylenetriaminepentaacetic acid, iminodisuccinic acid, their salts, and combinations thereof; and a potassium-containing salt, a sodium-containing salt or a combination thereof (preferably a potassium-containing salt).

In a further embodiment a composition of the invention may comprise:

an active ingredient (e.g. in a herbicidal effective amount) in the form of one of, or a mixture of, iron hydroxyethylene diaminetriacetate, iron ethylenediamine tetraacetate, iron ethylene diamine disuccinate, and iron glutamicacid diacetate; and a potassium-containing salt, a sodium-containing salt or a combination thereof (preferably a potassium-containing salt).

In a yet further embodiment a composition of the invention may comprise:

an iron chelate (e.g. in a herbicidal effective amount) selected from the group consisting of iron ethylenediamine tetraacetate (FeEDTA), iron hydroxyethylenediamine tetraacetate (FeHEDTA), and combinations thereof.

The invention will now be described, by way of example only, with reference to the following Examples.

EXAMPLES

Materials & Methods

Unless otherwise specified, all of the iron solutions were made using the same molar concentration of iron ion as chelating agent. In the liquid formulations samples were prepared by diluting a metal chelate, iron HEDTA (Neu 1173H) or iron EDTA to the desired level of iron as specified using stirring. Neu 1173H contains the stabilizer sodium citrate at 1.5% prior to dilution. Dilutions of iron HEDTA to the level of 0.25% Fe incorporate 0.08% sodium citrate into the spray solutions. KCl was then diluted and added to the diluted metal chelate.

In the dry formulations, the iron chelate was simply blended with KCl and with other fertilizer ingredients. Samples were usually prepared within 48 hours of treatment. All of the outside tests were done on areas of grass and white clover that were at least 2 months old. For the greenhouse tests, white clover and dandelion were grown in a commercial greenhouse mix using supplemental lighting and heating. Each plant was grown in a 2¼ inch pot to a minimum diameter of 15-20 cm. Perennial ryegrass was grown in 2¼ inch pots in the same greenhouse conditions as above and they are at least 4 weeks old at the time of application. Field and greenhouse trials had at least two and ten replicates respectively. All of the liquid solutions were sprayed onto the plants at a rate of 100 or 200 ml/m$^2$ using a handheld trigger sprayer. With dry formulations the granules were applied with a shaker to the plant surface at 50 to 80 g/m$^2$.

All plant damage was visually assessed using a percentage rating scale from 0 (no injury) to 100% (death). A damage rating of 40% or higher is considered high enough to control undesired plants. Percentage control was calculated from the respective weed cover data (e.g. preferably using the Henderson & Tilton formula).

Example 1

Greenhouse Dandelion and Turf Test of Iron Chelates with Potassium Chloride

All of the iron chelates (0.25% Fe) and the potassium chloride were sprayed twice at a volume of 200 ml/m$^2$ on to 0.25 m$^2$ of perennial ryegrass and dandelion. Observations were made 7 days after second spraying. The results are shown in Table 1 below.

TABLE 1

| | Grass Damage (%) | Dandelion Damage (%) |
|---|---|---|
| FeHEDTA 1.5% a.i. (0.25% Fe) | 6 | 63 |
| FeHEDTA 1.5% a.i. (0.25% Fe) + KCl 2% | 9 | 89 |
| Untreated | 0 | 0 |

Example 2

Field White Clover and Turf Test of Iron Chelates with Potassium Chloride

All of the iron chelates (0.25% Fe) and the potassium chloride were sprayed twice at a volume of 200 ml/m$^2$ on to 0.25 m$^2$ of perennial ryegrass and white clover. Observations were made 28 days after second spraying. The results are shown in Table 2 below.

TABLE 2

| | Grass Damage (%) | White Clover control (%) |
|---|---|---|
| FeHEDTA 1.5% a.i. (0.25% Fe) | 6 | 40 |
| FeHEDTA 1.5% a.i. (0.25% Fe) + KCl 1.5% | 7 | 81 |
| Untreated | 0 | 0 |

Example 3

Greenhouse Dandelion and Turf Test of Iron Chelates with Potassium Chloride

All of the iron chelates (0.8% Fe) and the potassium chloride were sprayed twice at a volume of 100 ml/m$^2$ on to 0.25 m$^2$ of perennial ryegrass and dandelion. Observations were made 7 days after second spraying. The results are shown in Table 3 below.

TABLE 3

| | Grass Damage (%) | Dandelion damage (%) |
|---|---|---|
| FeEDDS 4.98% a.i. (0.8% Fe) | 1 | 58 |
| FeEDDS 4.98% a.i. (0.8% Fe) + KCl 1% | 0 | 88 |
| Untreated | 0 | 0 |

Example 4

Greenhouse White Clover and Turf Test of Iron Chelates with Potassium Chloride

All of the iron chelates (0.25% Fe) and the potassium chloride were sprayed twice at a volume of 200 ml/m$^2$ on to 0.25 m$^2$ of perennial ryegrass and white clover. Observations were made fourteen days after first spraying. The results are shown in Table 4 below.

TABLE 4

| | Grass Damage (%) | White Clover Damage (%) |
|---|---|---|
| FeEDTA 1.78% a.i. (0.25% Fe) | 0 | 47 |
| FeEDTA 1.78% a.i. (0.25% Fe) + KCl 2% | 0 | 74 |
| Untreated | 0 | 0 |

Example 5

Greenhouse White Clover and Turf Test of Iron Chelates with Potassium Chloride

All of the iron chelates (0.25% Fe) and the potassium chloride were sprayed twice at a volume of 100 ml/m$^2$ on to 0.25 m$^2$ of perennial ryegrass and white clover. Observations were made seven days after first spraying. The results are shown in Table 5 below.

TABLE 5

| | Grass Damage (%) | White Clover Damage (%) |
|---|---|---|
| FeHEDTA 1.5% a.i. (0.25% Fe) | 4 | 58 |
| KCl 2% | 0 | 0 |
| FeHEDTA 1.5% a.i. 0.25% Fe + KCl 2% | 4 | 82 |
| Untreated | 0 | 0 |

Example 6

Greenhouse White Clover and Turf Test of Iron Chelates with Potassium Chloride

All of the iron chelates (0.25% Fe) and the potassium chloride were sprayed twice at a volume of 200 ml/m$^2$ on to 0.25 m$^2$ of perennial ryegrass and white clover. Observations were made two days after first spraying. The results are shown in Table 6 below.

TABLE 6

| | Grass Damage (%) | White Clover Damage (%) |
|---|---|---|
| FeEDTA 1.78% a.i. (0.25% Fe) | 0 | 18 |
| FeEDTA 1.78% a.i. (0.25% Fe) + KCl 2% | 1 | 54 |
| Untreated | 0 | 0 |

Example 7

Greenhouse White Clover and Turf Test of Iron Chelates with Potassium Chloride

All of the iron chelates (0.25% Fe) and potassium chloride were sprayed twice at a volume of 200 ml/m$^2$ on to 0.25 m$^2$ of perennial ryegrass and white clover. Observations were made seven days after first spraying. The results are shown in Table 7 below.

TABLE 7

| | Grass Damage (%) | White Clover Damage (%) |
|---|---|---|
| FeEDTA 1.78% a.i. (0.25% Fe) | 0 | 24 |
| FeEDTA 1.78% a.i. (0.25% Fe) + KCl 1.5% | 0 | 55 |
| Untreated | 0 | 0 |

Example 8

Field Dandelion and Turf Test of Dry Composition of Iron Chelates with Potassium Chloride The granules containing iron chelates (0.9% Fe) plus potassium chloride (20%) were applied as an RTU granule twice at the rate of 50 g/m$^2$ on to 0.25 m$^2$ of perennial ryegrass and dandelion. Observations were made seven days after second application. The results are shown in Table 8 below.

TABLE 8

| | Grass Damage (%) | Dandelion damage (%) |
|---|---|---|
| Dry FeHEDTA 7% (0.98% Fe) | 3 | 65 |
| Dry FeHEDTA 7% (0.98% Fe) + potassium chloride 20% | 3 | 81 |
| Untreated | 0 | 0 |

Example 9

Greenhouse Dandelion Test Dry Composition of Iron Chelates with Potassium Chloride All of the iron chelates (0.9% Fe) and the potassium chloride were applied once at the rate of 50 g/m$^2$ on to dandelion. Observations were made twenty eight days after application. The results are shown in Table 9 below.

TABLE 9

| | Dandelion damage (%) |
|---|---|
| Dry FeHEDTA 7% (0.9% Fe) + powdered sugar 20% + corncob 73% | 57 |
| Dry FeHEDTA 7% (0.98% Fe) + potassium chloride 20% + corn cob 73% | 82 |
| Untreated | 0 |

Example 10

Greenhouse Dandelion and Turf Test of Iron Chelates with Sodium Sulfate

All of the iron chelates (0.25% Fe) and sodium sulfates were sprayed once at a volume of 200 ml/m$^2$ on to 0.25 m$^2$ of perennial ryegrass and dandelion. Observations were made six days after first spraying. The results are shown in Table 10 below.

TABLE 10

| | Grass Damage (%) | Dandelion damage (%) |
|---|---|---|
| FeHEDTA 1.5% a.i. (0.25% Fe) | 4 | 35 |
| FeHEDTA 1.5% a.i. (0.25% Fe) + $Na_2SO_4$ 2% | 4 | 95 |
| $Na_2SO_4$ 2% | 4 | 0 |
| Untreated | 0 | 0 |

All publications mentioned in the above specification are herein incorporated by reference. Various modifications and variations of the described methods and system of the present invention will be apparent to those skilled in the art without departing from the scope and spirit of the present invention. Although the present invention has been described in connection with specific preferred embodiments, it should be understood that the invention as claimed should not be unduly limited to such specific embodiments. Indeed, various modifications of the described modes for carrying out the invention which are obvious to those skilled in chemistry, biochemistry and biotechnology or related fields are intended to be within the scope of the following claims.

The invention claimed is:

1. A method for selectively controlling the growth of undesired vegetation, said method comprising:

a. providing a ready-to-use (RTU) composition comprising an iron chelate comprising a complex of iron and a chelating agent, wherein the iron chelate is present at a concentration of at least 1% by weight, and a salt at a concentration of 1% to 25.0% by weight;

wherein the salt is selected from the group consisting of potassium chloride, potassium sulfate, potassium citrate, sodium chloride, sodium sulfate and combinations thereof; and b. contacting an area of vegetation and/or the ground in which said vegetation is present with said ready-to-use composition at a rate in the range of 0.2 g $Fe/m^2$ to 2.0 g $Fe/m^2$;

wherein, following said contacting step, undesired vegetation present in said area of vegetation and/or ground is destroyed while growth of desired vegetation present in said area of vegetation and/or ground is relatively unharmed;

said undesired vegetation is selected from the group consisting of dandelions, false dandelions, white clover, daisies, chickweed, black medick, mosses, liverworts, ferns, horsetails, conifers, dicotyledonous plants, algae and combinations thereof; and said desired vegetation is selected from the group consisting of grass, lawn, pastureland and combinations thereof.

2. A selective ready-to-use (RTU) herbicidal composition comprising:

an iron aminopolycarboxylate chelate, comprising a complex of iron and an aminopolycarboxylate chelating agent, wherein the iron aminopolycarboxylate chelate is present at a concentration of at least 3% by weight; and a salt, present at a concentration of 1% to 25.0% by weight, wherein the salt is selected from the group consisting of potassium chloride, potassium sulfate, potassium citrate, sodium chloride, sodium sulfate and combinations thereof;

wherein said composition has enhanced selective herbicidal activity when applied at a rate in the range of 0.2 g $Fe/m^2$ to 2.0 g $Fe/m^2$ to an area of vegetation and/or ground in which said vegetation is present containing desired vegetation and undesired vegetation when compared with an otherwise identical composition lacking said salt;

said undesired vegetation is selected from the group consisting of dandelions, false dandelions, white clover, daisies, chickweed, black medick, mosses, liverworts, ferns, horsetails, conifers, dicotyledonous plants, algae and combinations thereof;

said desired vegetation is selected from the group consisting of grass, lawn, pastureland and combinations thereof; and the herbicidal composition is formulated as a dry granule comprising the iron aminopolycarboxylate chelate and the salt.

3. The herbicidal composition of claim 2, wherein the iron aminopolycarboxylate chelate comprises iron selected from the group consisting of ferric iron, ferrous iron and combinations thereof.

4. The herbicidal composition of claim 2, wherein the iron aminopolycarboxylate chelate is a complex of iron and an aminopolycarboxylate chelating agent selected from the group consisting of hydroxyethylenediaminetriacetic acid, ethylenediaminetetraacetic acid, diamino cyclohexane tetraacetic acid, ethylenediamine disuccinic acid, ethanoldiglycine, methylglycinediacetic acid, glutamicaciddiacetic acid and combinations thereof.

5. The herbicidal composition of claim 2, wherein the iron aminopolycarboxylate chelate is selected from the group consisting of iron hydroxyethylenediaminetriacetic acid, iron ethylenediaminetetraacetic acid, iron gluconic acid, iron glutamicaciddiacetic acid, iron ethylenediamine disuccinate, iron methylglycinediacetate, iron aminotri (methylenephosphonic acid), iron ethanoldiglycine, iron hydroxyethyldiphosphonic acid, iron iminodisuccinic acid, iron hydroxy iminodisuccinic acid and combinations thereof.

6. The herbicidal composition of claim 2, wherein the iron aminopolycarboxylate chelate is selected from the group consisting of iron hydroxyethylene diaminetriacetate, iron ethylenediamine tetraacetate, iron ethylene diamine disuccinate, iron glutamic acid diacetate and combinations thereof.

7. The method of claim 1, wherein said rate is in the range of 0.2 g $Fe/m^2$ to 1.8 g $Fe/m^2$.

8. The method of claim 1, wherein said rate is in the range of 0.25 g $Fe/m^2$ to 1.8 g $Fe/m^2$.

9. The herbicidal composition of claim 2, wherein the salt comprises potassium chloride.

10. The herbicidal composition of claim 2, wherein the salt comprises sodium sulfate.

11. The herbicidal composition of claim 2, wherein the salt comprises potassium chloride and sodium sulfate.

12. The method of claim 1, wherein the salt comprises potassium chloride.

13. The method of claim 1, wherein the salt comprises sodium sulfate.

14. The method of claim 1, wherein the salt comprises potassium chloride and sodium sulfate.

15. The method of claim 1, wherein the iron chelate comprises iron selected from the group consisting of ferric iron, ferrous iron and combinations thereof.

16. The method of claim 1, wherein the iron chelate is a complex of iron and an aminopolycarboxylate chelating agent selected from the group consisting of hydroxyethylenediaminetriacetic acid, ethylenediaminetetraacetic acid, diamino cyclohexane tetraacetic acid, ethylenediamine disuccinic acid, ethanoldiglycine, methylglycinediacetic acid, glutamicaciddiacetic acid, and combinations thereof.

17. The method of claim 1, wherein the iron chelate is selected from the group consisting of iron hydroxyethylenediaminetriacetic acid, iron ethylenediaminetetraacetic acid, iron gluconic acid, iron glutamicaciddiacetic acid, iron ethylenediamine disuccinate, iron methylglycinediacetate, iron aminotri (methylenephosphonic acid), iron ethanoldiglycine, iron hydroxyethyldiphosphonic acid, iron iminodisuccinic acid, iron hydroxy iminodisuccinic acid and combinations thereof.

18. The method of claim 1, wherein the iron chelate is selected from the group consisting of iron hydroxyethylene diaminetriacetate, iron ethylenediamine tetraacetate, iron ethylene diamine disuccinate, iron glutamic acid diacetate and combinations thereof.

19. The method of claim 1, wherein the grass is selected from the group consisting of Perennial ryegrass (*Lolium perenne* L.), Kentucky bluegrass (*Poa pratensis* L.), Chewings fescue (*Festuca rubra* spp. Commutate), Creeping fescue (*Festuca rubra* spp. *rubra/trichophylla*), Tall fescue (*Festuca arundinacea* Schreb.), Blue fescue (*Festuca glauca* Villars.), Colonial bentgrass (*Agrotis tenuis* Sibth), Annual bluegrass (*Poa annua* L.), Bermudagrass (*Cynodon dactylon*), Centipedegrass (*Eremochloa ophiuroides*), St. Augustinegrass (*Stenotaphrum secundatum*) and *Zoysia* grass (*Zoisia* spp.).

20. A selective ready-to-use (RTU) herbicidal composition comprising:

a transition metal aminopolycarboxylate chelate, comprising a complex of a transition metal and an aminopolycarboxylate chelating agent, wherein the transition metal aminopolycarboxylate chelate is present at a concentration of at least 3% by weight; and a salt, present at a concentration of 1% to 25.0% by weight, wherein the salt is selected from the group consisting of potassium chloride, potassium sulfate, potassium citrate, sodium chloride, sodium sulfate and combinations thereof;

wherein said composition has enhanced selective herbicidal activity when applied at a rate in the range of 0.2 g transition metal/$m^2$ to 2.0 g transition metal/$m^2$ to an area of vegetation and/or ground in which said vegetation is present containing desired vegetation and undesired vegetation when compared with an otherwise identical composition lacking said salt;

said undesired vegetation is selected from the group consisting of dandelions, false dandelions, white clover, daisies, chickweed, black medick, mosses, liverworts, ferns, horsetails, conifers, dicotyledonous plants, algae and combinations thereof;

said desired vegetation is selected from the group consisting of grass, lawn, pastureland and combinations thereof;

the herbicidal composition is formulated as a dry granule comprising the transition metal aminopolycarboxylate chelate and the salt, and the transition metal is selected from the group consisting of copper, manganese, nickel and zinc.

* * * * *